US006805721B2

(12) United States Patent
Burch et al.

(10) Patent No.: US 6,805,721 B2
(45) Date of Patent: Oct. 19, 2004

(54) FUEL PROCESSOR THERMAL MANAGEMENT SYSTEM

(76) Inventors: Steven D. Burch, 11 Brigham Cir., Honeoye Falls, NY (US) 14472; Steven G. Goebel, 869 Sagamore Way, Victor, NY (US) 14564; William H. Pettit, 16 Essex Dr., Rochester, NY (US) 14623

(*) Notice: Subject to any disclaimer, the term of this patent is extended or adjusted under 35 U.S.C. 154(b) by 0 days.

(21) Appl. No.: 10/044,130

(22) Filed: Jan. 10, 2002

(65) Prior Publication Data

US 2003/0129108 A1 Jul. 10, 2003

(51) Int. Cl.[7] ................................................ B01F 3/02
(52) U.S. Cl. .................... 48/198.3; 48/198.1; 48/198.7; 423/650; 423/651; 423/652
(58) Field of Search ............................ 48/127.9, 197 R, 48/198.1, 198.3, 198.7; 423/650–652; 422/188, 189, 190, 198, 211

(56) References Cited

U.S. PATENT DOCUMENTS

| | | | |
|---|---|---|---|
| 4,522,894 A | 6/1985 | Hwang et al. | |
| 4,743,517 A | 5/1988 | Cohen et al. | |
| 5,360,679 A | 11/1994 | Buswell et al. | |
| 6,077,620 A | 6/2000 | Pettit | |
| 6,083,425 A | 7/2000 | Clawson et al. | |
| 6,123,913 A | 9/2000 | Clawson et al. | |
| 6,126,908 A | 10/2000 | Clawson et al. | |
| 6,132,689 A | 10/2000 | Skala et al. | |
| 6,238,815 B1 | 5/2001 | Skala et al. | |
| 6,290,913 B1 * | 9/2001 | Aoyama | |
| 6,413,661 B1 | 7/2002 | Clingerman et al. | |
| 6,416,893 B1 | 7/2002 | Clingerman et al. | |
| 6,436,561 B1 | 8/2002 | Hart-Predmore et al. | |
| 6,451,465 B1 | 9/2002 | Chalfant et al. | |
| 6,485,853 B1 | 11/2002 | Pettit et al. | |

FOREIGN PATENT DOCUMENTS

EP          0 977 293 A2    2/2000

* cited by examiner

Primary Examiner—Jerry D. Johnson
Assistant Examiner—Basia Ridley
(74) Attorney, Agent, or Firm—Cary W. Brooks, Esq.; Linda M. Deschere, Esq.

(57) ABSTRACT

An improved fuel processor thermal management system for use with a fuel cell is disclosed. The process includes supplying an air stream and a fuel stream into a auto thermal reactor (ATR) and forming reformate gas therein. Then, preferentially oxidizing the reformate gas and the air stream in the preferential oxidizer reactor (PrOx). The temperature of the preferential oxidizer reaction is controlled with a water stream by vaporizing the water stream to form a first portion of vaporized water. Then, reacting the air stream with the reformate gas exiting the PrOx is reached in a fuel cell to form an anode exhaust stream which is subsequently combined with the air stream to heat the water stream to form a second portion of vaporized water. The first portion of vaporized water and the second portion of vaporized water form a steam fluid. The steam fluid heats the auto thermal reactor and the air stream prior to entering the ATR and the reformate gas prior to entering the water shift gas reactor (WGS) to control the temperature of the reformate gas.

10 Claims, 2 Drawing Sheets

FUEL PROCESSOR THERMAL MANAGEMENT SYSTEM

FIELD OF THE INVENTION

The invention relates to a thermal management system for the processing of fuel for fuel cells.

BACKGROUND OF THE INVENTION

Fuel cells are a leading alternate fuel powerplant candidates for both portable and stationary electrical power generation. A fuel cell is an electrochemical energy converter consisting of two electrodes which sandwich an electrolyte. In one form being developed for both portable and stationary applications, an ion-conducting polymer electrolyte membrane (PEM) is disposed between two electrode layers to form a membrane electrode assembly (MEA). The MEA is typically porous and electrically conductive to promote the desired electrochemical reaction from two reactants. One reactant, oxygen or air, passes over one electrode and hydrogen, the other reactant, passes over the other electrode to produce electricity, water and heat. Typical PEM fuel cells with membrane electrode assembly (MEA) are described in U.S. Pat. Nos. 5,272,017 and 5,316,871, issued respectively Dec. 21, 1993 and May 31, 1994 and assigned to the General Motors Corporation.

For vehicular applications, it is desirable to use a liquid fuel such as a low molecular weight alcohol (e.g., methanol or ethanol), or hydrocarbons (e.g., gasoline) as the fuel for the vehicle because of the ease of onboard storage of liquid fuels and the existence of a nationwide infrastructure for supplying liquid fuels. However, liquid fuels must be dissociated to release their hydrogen content from the liquid fuel prior to use in a fuel cell. The dissociation reaction is accomplished heterogeneously within a chemical fuel processor, also known as a reformer, that in conjunction with thermal energy and a suitable catalyst, yields a reformate gas including $N_2$, $H_2O$, $CO_2$, $H_2$ and CO.

The heat required to produce sufficient hydrogen varies with the energy demand required by the fuel cell system at any given moment in time. Accordingly, the heating system for the reformer must be capable of operating over a wide range of energy output. Heating a reformer with heat generated externally is generally known in the prior art. One such reformer is described in U.S. Pat. No. 4,650,727 to Vanderborgh. The reformate exiting the reformer, however, may contain undesirably high concentrations of carbon monoxide (CO) most of which must be removed (i.e., to a concentration of less than about 50 ppm) to prevent poisoning of the fuel cell's anode.

It is known that the CO level of the reformate/effluent exiting a reformer can be reduced by utilizing a well-known "water gas shift" (WGS) reaction where water (i.e., in the form of steam) is added to the reformate/effluent exiting the reformer in the presence of a suitable catalyst. This lowers the carbon monoxide content of the reformate/effluent gas.

However, some CO (i.e., about 0.5 mole % or more) still survives the shift reaction. Hence, shift reactor effluent gases include hydrogen, carbon dioxide, water and carbon monoxide. If the shift reaction is not sufficient to reduce the CO content of the reformate to a satisfactory level (i.e., to below about 50 ppm), it may be necessary to further remove carbon monoxide from the hydrogen-rich reformate stream exiting the shift reactor prior to supplying the effluent gas to the fuel cell. It is known to further reduce the CO content of $H_2$-rich reformate gas exiting the shift reactor by a preferential oxidation or PrOx reaction effected in a suitable reactor operated at temperatures which promote the preferential oxidation of the CO by air in the presence of the $H_2$, but without consuming/oxidizing substantial quantities of the $H_2$ or triggering the so-called "reverse water gas shift" (RWGS) reaction.

The preferential oxidation process is described in a paper entitled "Methanol Fuel Processing for Low Temperature Fuel Cells" published in the Program and Abstracts of the 1988 Fuel Cell Seminar, Oct. 23–26, 1988, Long Beach, Calif., and in U.S. Pat. No. 5,271,916, issued to Vanderborgh et. al. Preferential oxidation reactors may be either adiabatic (i.e. where the temperature of the reactor is allowed to rise during oxidation of the CO) or isothermal (i.e. where the temperature the reactor is maintained substantially constant during oxidation of the CO). The adiabatic preferential oxidation process is sometimes effected by means of a number of sequential stages, which progressively reduce the CO content in stages, and requires careful temperature control, to prevent the reverse water gas shift reaction which counterproductively consumes $H_2$ and produces more CO. The isothermal process can effect the same CO reduction as the adiabatic process, but in fewer stages and without concern for the reverse water gas shift reaction if the reactor temperature can be kept low enough, and $O_2$ depletion near the exit of the reactor unit can be avoided.

One known isothermal reactor is essentially a catalyzed heat exchanger having a thermally conductive barrier or wall that separates the heat exchanger into a first channel through which the $H_2$-rich gas to be decontaminated (i.e. CO removed) passes, and a second channel through which a coolant flows to maintain the temperature of the reactor substantially constant within a defined working range. The barrier wall has a catalyzed first surface confronting the first channel for promoting the $CO+O_2$ reaction, and an uncatalyzed second surface confronting the second channel for contacting the coolant therein to extract heat from the catalyzed first surface through the barrier. Therefore, it has been found that the proper control of the fuel processor for fuel cells requires the thermal management of the water gas shift and the preferential oxidation reactors such that the reactors (primarily WGS and PrOx) are operated within their preferred temperature ranges. This means removing heat from the reformate stream entering the water gas shift and preferential oxidation reactors and in some cases removing the heat of reaction within the reactors (by means of a catalyzed heat exchanger).

Conventional fuel processor systems have little or no thermal management. One system uses high temperature oil to remove the heat rejected by the preferential oxidation reactor and uses an air-to-oil heat exchanger to reject this heat to the ambient environment. Another system utilizes the heat from the reactors and heat exchangers with high temperature oil. Such systems require additional hardware, add an additional large thermal mass, are complex and add volume to the fuel processor, as well as additional control and maintenance issues.

Therefore, there is a need for a fuel processor thermal management system that does not add additional mass, complexity and volume to the fuel cell thermal system and utilizes one of the process fluid streams as a heat transfer medium to control the fuel processor.

SUMMARY OF THE INVENTION

The present invention seeks to improve the thermal management of a fuel processor by utilizing ATR process water for the thermal media. There are several advantages including a minimal parasitic pumping power requirement for the media since water can be pumped to a high pressure in liquid form, prior to its vaporization. Additionally, significant heat absorption is available with a relatively low mass flow rate by using the high latent heat energy of water. Water also has a higher sensible heat capacity and thermal conductivity compared to other known process fluids used in fuel cell systems.

The present invention is directed to a thermal management process that is adapted for use with a fuel processor for a fuel cell. The fuel processor system having an auto thermal reformer, a water gas shift reactor, a preferential oxidation reactor, a first air (ATR) stream, a fuel stream and a first (ATR) vaporized water stream. The process includes supplying the air, vaporized water and fuel streams into the auto thermal reformer (ATR). The ATR effluent is fed into the water gas shift (WGS) reactor with a second (WGS) vaporized water stream. The WGS effluent is fed into the preferential oxidation reactor (PrOx) with a second (PrOx) air stream. Control of the temperature of the PrOx is performed through vaporization of the water streams to form a first portion of vaporized water. The PrOx effluent and a third (stack) air stream are fed to the fuel cell stack. The anode exhaust stream is combined with a fourth (combustor) air stream which is fed to the combustor. The combustor exhaust heats a third vaporized water stream to form a second portion of vaporized water. The first portion of vaporized water and the second portion of vaporized water forming a steam fluid. The ATR effluent (i.e. the reformate gas exiting the ATR) gives up heat to the steam and air streams prior to entering the WGS. In this way, the temperature of the ATR effluent is conditioned for further reformation in the system, and the steam and air streams being sent to the ATR inlet are preheated to maximize reformer efficiency.

The present invention provides independent temperature control of each chemical reactor resulting in minimum reactor size and maximum performance throughout turn-down and transients, with maximum utilization of waste heat for vaporization and preheating of the auto thermal reformer air, water, and fuel to minimize auto thermal reformer air requirements (o/c ratio) and thereby maximize fuel processor efficiency. In addition, the present invention accomplishes fuel processor thermal management with increased flexibility, lower mass and volume and potentially lower maintenance than a fuel processor thermal management system that uses a separate heat carrier loop (such as oil).

For a more complete understanding of the invention, its objects and advantages, reference should be made to the following specification and to the accompanying drawings.

BRIEF DESCRIPTION OF THE DRAWINGS

The drawings which form an integral part of the specification, are to be read in conjunction therewith.

DETAILED DESCRIPTION OF THE PREFERRED EMBODIMENTS

Figure 1:
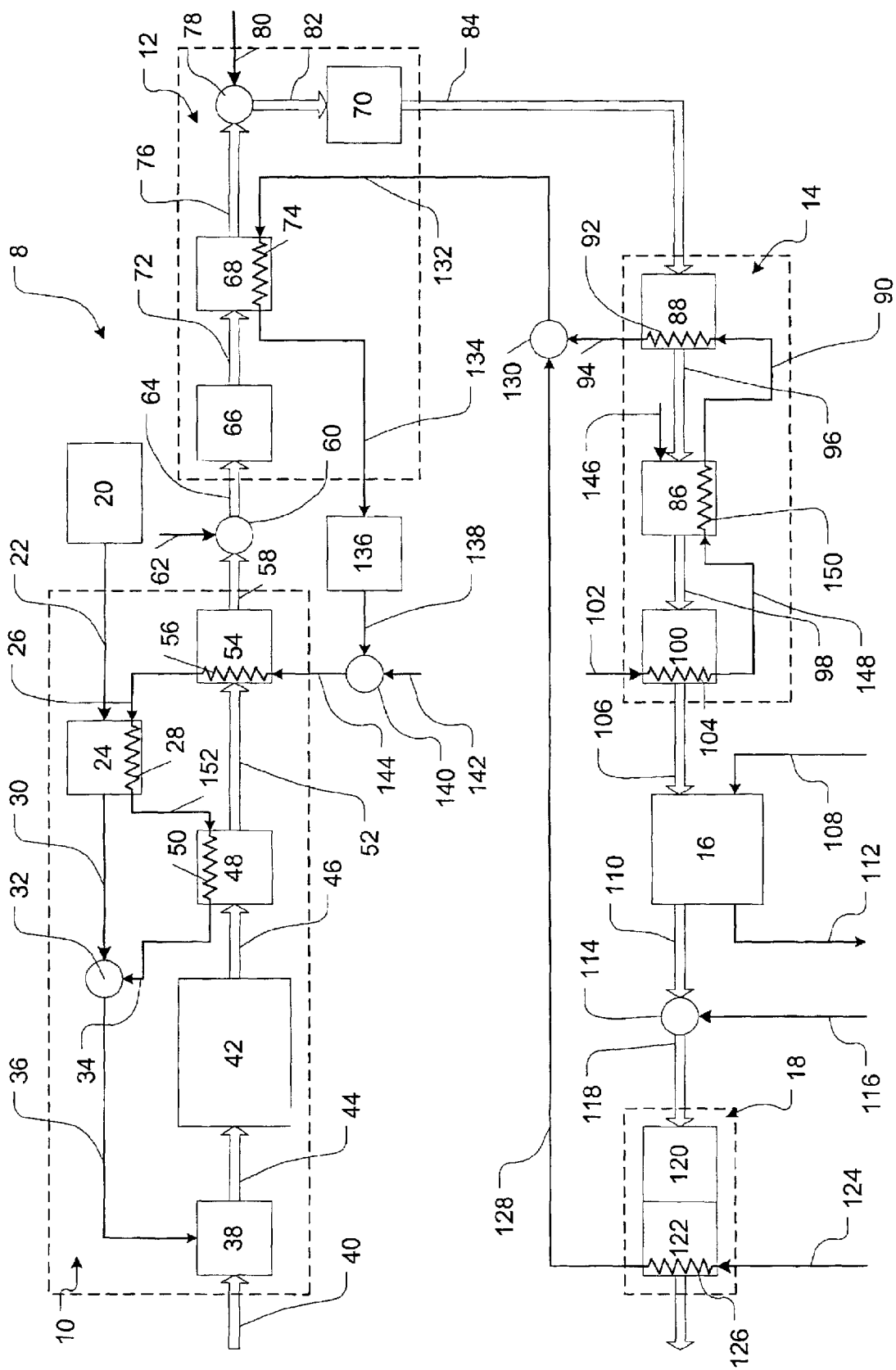
FIG. 1 is a schematic diagram of the preferred embodiment of the process according to the present invention.

The present invention is directed to a fuel cell system having a fuel processor as shown in FIG. 1 and generally designated by the reference numeral 8. The system 8 includes a primary reactor 10, a water gas shift (WGS) reactor 12, a preferential oxidation (PrOx) reactor 14, a fuel cell 16 and a catalytic combustor 18. The system 8 may best be understood with a description of the formation and flow of the reformate gas stream there through.

Initially, ambient air is pumped by compressor 20 through line 22 into heat exchanger 24 where the air is heated by steam flowing through line 26 into bundle 28. The heated air flows from heat exchanger 24 through line 30 into mixing volume 32. Steam, flowing through line 34, mixes with the heated air in mixing volume 32 to form a heated air/steam mixture. The heated air/steam mixture flows through line 36 into the inlet 38 of primary reactor 10. Fuel, typically in the form of gasoline, flows through line 40 and is mixed with the heated air/steam mixture in the inlet 38 to form a fuel/air/steam mixture.

The fuel/air/steam mixture enters into an auto thermal reformer or ATR 42 through line 44 where the mixture is catalytically reacted to form a hydrogen rich gas which is discharged through line 46. The reformate gas comprises primarily hydrogen ($H_2$) and carbon dioxide ($CO_2$) but also includes nitrogen ($N_2$), carbon monoxide (CO), water ($H_2O$), and methane ($CH_4$). To minimize the amount of methane formed in ATR 42, the temperature of the reformate gas is generally kept to a range between 700° C. and 750° C. as the gas stream exits ATR 42. In this regard, the temperature of the reformate gas flowing out of ATR 42 is a function of the amount of air used in ATR 42, that is, the oxygen to carbon (O/C) ratio and the temperature of the air, fuel and water that is introduced into ATR 42. Because a higher O/C ratio generally results in a lower efficiency of ATR 42, it is preferable to preheat the air, steam and fuel before entering ATR 42. In order to control the temperature of reformate gas exhausted from ATR 42, a heat exchanger 48 is used. Heat exchanger 48 has a bundle 50 which is in close contact with the reformate gas. Steam in bundle 50 absorbs heat from the reformate gas in line 46 and exists heat exchanger 48 into passage 34 which is connected via mixing volume 32 as described earlier. The reformate gas exits heat exchanger 48 through line 52. Optionally, another heat exchanger 54 may be utilized downstream of heat exchanger 48 and performs a similar function. With the addition of heat exchanger 54, a 2-stage heat control system of the reformate gas flowing through the primary reactor 10 is provided. Heat exchanger 54 has a bundle 56 with steam which is in close contact with the reformate gas to control the temperature thereof.

Reformate gas exits heat exchanger 54 through line 58 and is connected to a mixing volume 60. Ambient water is pumped in through line 62, mixed with the reformate gas and discharged through line 64 into the WGS reactor 12. Preferably, water is sprayed into mixing volume 60 by means of conventional water injection nozzles. The water mixes with and controls the temperature of the reformate gas entering WGS reactor 12. The use of water at this point also aids in controlling the temperature of the reformate gas under transient conditions or unexpected temperature excursions of ATR 42 that could potentially damage the WGS reactor 12 or could result in an increased formation of CO therein. The addition of ambient water into the reformate gas has a further benefit of increasing the steam to carbon (S/C) ratio in the WGS reactor 12, thereby having the desirable effect of converting more CO and water to $CO_2$ and $H_2$.

The WGS reactor 12 includes a medium temperature shift (MTS) reactor 66, a heat exchanger 68 and a low temperature shift (LTS) reactor 70. Alternately, a high temperature shift (HTS) reactor could be used in place of the MTS reactor 66. As used herein, an HTS reactor operates in about the range of 400 to 550° C., MTS reactor operates in the range of about 300 to 400° C. and an LTS reactor operates in the range of about 200 to 300° C. The reformate gas stream passes through MTS reactor 66 to reduce the CO level of the gas and is discharged through line 72. Adjacent to MTS reactor 66 is a heat exchanger 68 to control the temperature of the reformate gas within the water gas shift reactor 12. Heat exchanger 68 transfers heat from the reformate gas to steam flowing through bundle 74. The cooled reformate gas is discharged through line 76 into mixing volume 78 where it is mixed with ambient water injected into the reformate gas through line 80 to further cool the reformate gas. The reformate gas is discharged from mixing volume 78 through line 82 into the LTS reactor 70. If the secondary cooling is not required, mixing volume 78 can be eliminated. Reformate gas passes through the LTS reactor 70 to further reduce the carbon monoxide level therein and is discharged through line 84. After passing through the WGS reactor 12, the reformate gas flows into the preferential oxidation (PrOx) reactor 14 which includes a unit reactor 86 to further reduce the carbon monoxide in the reformate gas to an acceptable level (i.e., below 50 ppm). In order to optimize the performance of unit reactor 86, a heat exchanger 88 is installed between LTS reactor 70 and unit reactor 86. Heat exchanger 88 is used to control the temperature of the reformate gas. Specifically, the temperature of the reformate gas exiting the WGS reactor 12 is generally in the range of about 250 to 400° C. depending on the type of WGS reactor used. However, the desired temperature of reformate gas prior to entering unit reactor 86 is in the range of about 150 to 200° C. Heat exchanger 88 cools the reformate gas by inputting a mixture of liquid water and water vapor having a high vapor quality (i.e., in the range of 0.7 to 1.0) through line 90 into a bundle 92. The vaporized water is heated to achieve a slightly super-heated, high quality water vapor (i.e. about 150° C. and 0.7 to 1.0 vapor quality) and discharged through line 94. As used herein, vapor quality refers to the mass fraction that is a vapor (i.e., steam). High vapor quality refers to the condition where the liquid water has been almost completely vaporized to its gaseous state.

The reformate gas flows from heat exchanger 88 through line 96 to the PrOx reactor 86 and is discharged through line 98 where it enters heat exchanger 100. Water is provided at line 102 and flows through bundle 104 of heat exchanger 100. This heat transfer step provides preheating of the water in line 148 utilized by heat exchange element 150 of unit reactor 86 to reduce the possibility that the PrOx reaction will be quenched or stopped by over cooling the catalyst within PrOx reactor 86. The water flowing through bundle 104 further cools the reformate gas to a temperature of approximately 90° C. before entering the fuel cell stack 16. Heat exchanger 100 is also utilized to reduce the heat rejection load of the fuel cell stack coolant, and thereby reduce the size and fan requirements of the fuel cell cooling system.

The reformate gas enters into the anode side of fuel cell 16 through line 106. Air enters the cathode side of fuel cell 16 through line 108. The reformate gas and air react in fuel cell 16 to produce electricity and water vapor in a conventional manner. Any unused reformate gas exits fuel cell 16 through the anode exhaust line 110. Unused air and water vapor exits the fuel cell 16 through the cathode exhaust line 112. The anode exhaust in line 110 flows into a mixing volume 114 where it is mixed with compressed air provided through line 116 to form an anode exhaust/air mixture which is discharged through line 118. In this regard, the cathode exhaust line 112 may be coupled to mixing volume 114 to provide the required air.

The cathode exhaust/air mixture enters into a catalytic element 120 of combustor 18 where the mixture is catalyzed to form hot gases. A vaporizer 122 in the form of a heat exchanger is fluidly coupled to the catalytic element 120 and extracts heat from the hot gases generated thereby. Specifically, water passes through line 124 into bundle 126 where the heat is transferred from the hot exhaust gases to the water which is discharged in the form of steam through line 128. The exhaust from combustor 120 flows through vaporizer 122 which is preferably restricted by a flow restrictor such as a valve (not shown) to maintain the pressure of the reformate gas at an absolute pressure of between approximately 1 to 7 atmospheres and preferably at about 3 atmospheres.

The steam in line 94 from heat exchanger 88 and in line 128 from heat exchanger 122 are combined in mixing volume 130. These combined steam flows are discharged through line 132 which is fluidly coupled with bundle 74 of heat exchanger 68 in the WGS reactor 12. There heat from the water gas shift reaction is transferred to the steam and discharged in line 134. Pressure regulator 136 coupled to line 134 operates to maintain the steam pressure in the PrOx reactor 14 and combustor 18 at a substantially constant pressure level. Steam exiting pressure regulator 136 through 138 enters mixing volume 140 where it is combined with water provided through line 142. The outlet of mixing volume 140 is coupled to bundle 56 of heat exchanger 54 through line 144.

In order to better understand the thermal process management of the present invention, an exemplary thermal balance at full power condition of fuel cell 16 will now be described in relation first to the thermal condition of the reformate gas, and then of the water/steam loop. In this regard, the approximate reformate temperature drops and corresponding heat removal rates for WGS reactor 12 and PrOx reactor 14 are set forth in the table below.

|  | WGS | PrOx |
| --- | --- | --- |
| Reformate temperature drop | 750 to 330° C. | 330 to 170° C. |
| Heat removal from reformate | 0.194 kW/kWH$_2$ | 0.080 kW/kWH$_2$ |
| Heat of reaction (to be removed) | 0.025 kW/kWH$_2$ | 0.143 kW/kWH$_2$ |
| Total heat removed | 0.219 kW/kWH$_2$ | 0.223 kW/kWH$_2$ |

In addition to the heat being removed from the reformate stream, excess hydrogen from fuel cell 16 is typically converted to thermal energy by a catalytic combustor 18. Depending on the anode stoicheometry of the fuel cell stack 16, the additional heat from the excess hydrogen can be approximately 0.08 to 0.18 kW/kWH$_2$. Thus, for every 2 kW of H$_2$ chemical energy produced, more than 1 kW of thermal energy is produced. This represents a significant limitation to the overall fuel processor efficiency if this thermal energy is under utilized.

The optimization of thermal management has other benefits in the fuel processor system. The temperature of the reformate gas exiting ATR 42 is generally kept near 750° C. to minimize the amount of methane formed in ATR 42. As previously mentioned, this temperature, in turn, is a function of the air consumed in ATR 42 or O/C ratio. Because a higher O/C ratio generally leads to a lower ATR efficiency, the preferred approach is to preheat the air, steam and fuel entering the primary reactor 10. For steam reforming fuel processing systems, a ratio of the steam to carbon (S/C) ratio is used as a control parameter. Because a higher O/C ratio or S/C ratio generally relates to lower reformer efficiencies, the preferred approach is to preheat the air, steam and fuel prior to primary reformation. For example, with an S/C ratio of 2.8, about 0.23 kW/kWH$_2$ is required to vaporize the water and about 0.21 kW/kWH$_2$ are required to heat the fuel, steam and air mixture to a temperature of about 500° C. Hence, of the approximately 0.54 kW/kWH$_2$ of heat available, approximately 0.44 kW/kWH$_2$ or 81% can be utilized by the system to increase the fuel processor efficiency.

With this understanding of the importance of thermal balancing, the operation of fuel cell reforming system 8 will now be described. Air enters into heat exchanger 24 where the air is heated by steam flowing through bundle 28 to form heated air at a temperature of approximately 450° C. The heated air exits heat exchanger 24 through line 30 into mixing volume 32 where it mixes with steam from line 34 to form a heated air/steam mixture of approximately 625° C. The heated air/steam mixture flows out of mixing volume 32 through line 36.

The mixture in line 36 flows into inlet plenum 38. In plenum 38, fuel enters through line 40 where it is mixed with the heated air/steam mixture to form a heated air/steam/fuel mixture at approximately 500° C. The air/steam/fuel mixture flows through line 44 into ATR 42 and is discharged as reformate gas through line 46 at a temperature of approximately 760° C. The reformate gas then flows into heat exchanger 48 where it is cooled to a temperature of approximately 550° C. and discharged through line 52.

The reformate gas next flows into a second heat exchanger 54 and is further cooled to approximately 400° C. The reformate gas is discharged through line 58 into a mixing volume 60 where ambient water from line 62 is sprayed into mixing volume 60 and cools the reformate gas stream to a temperature of approximately 330° C. The reformate gas/water stream enters into HTS reactor 66 where the carbon monoxide level is reduced causing the temperature of the reformate gas to increase slightly to a temperature of approximately 380° C. After exiting the HTS reactor 66, the reformate gas flows through line 72 into heat exchanger 68 where the reformate gas is again cooled to a temperature of approximately 300° C. Next, the reformate gas is discharged through line 76 to flow into mixing volume 78 where it is mixed with water from line 80 in mixing volume 78 and cooled to a temperature of approximately 280° C. The reformate gas is discharged from mixing volume 78 through line 82 into LTS reactor 70 where the level of CO is reduced and the reformate gas is discharged through line 84.

Next, the reformate gas enters heat exchanger 88 where it is cooled to a temperature in the range of approximately 150 to 200° C. prior to entering PrOx reactor 86 through line 96. Air is provided to PrOx reactor 86 through line 146 where it is combined with the reformate gas to further reduce the carbon monoxide to an acceptable level. From PrOx reactor 86, the reformate gas flows through line 98 into heat exchanger 100 where it is cooled to a temperature of approximately 90° C.

The reformate gas is discharged from heat exchanger 100 through line 106 to the anode side of the fuel cell 16. Air is supplied to the cathode side of fuel cell 16 through line 108. The reformate gas and air are reacted in fuel cell 16 by the MEA to generate electrical power. The unused reformate gas exits through the anode exhaust line 110 to mixing volume 114. Likewise, the excess air or cathode exhaust exits through line 112. At mixing volume 114, air supplied through line 116 is combined with the anode exhaust stream and discharged through line 118 into catalytic combustor 120 where the mixture is burned to form hot gases. The heat generated in combustor 120 are recovered in vaporizer 122 before being exhausted to the atmosphere.

The operation of the heat transfer water/steam loop will now be described in further detail working backwards through fuel processing system 8. As previously described, vaporizer 122 is a heat exchanger with bundle 126 which extracts heat from the hot gases flowing out of combustor 120. Water, introduced through inlet line 124 passes through bundles 126 and is discharged out line 128. The water is pressurized by a pump (not shown) to a pressure preferably between 1 to 7 atmospheres and most preferably at about 3 atmospheres. The water passing through bundle 126 is fully vaporized and super heated at a temperature of approximately 150° C. at about 3 atmospheres. The steam from bundle 126 flows through line 128 to mixing volume 130.

A second source of steam is provided to mixing volume 130. Ambient water enters bundle 104 of heat exchanger 100 through line 102 at a pressure of between 1 to 7 atmospheres and preferably at a pressure of approximately 3 atmospheres. The water absorbs heat from the reformate gas as it passes through heat exchanger 100. The heated water exits through line 148 and enters bundle 150 of PrOx reactor 86. In PrOx reactor 86, the heated water absorbs additional heat from the reformate gas and exits out of PrOx reactor 86 through line 90 having a high vapor quality on the order of 0.7 to 1.0 and preferably about 0.85. Line 90 which is coupled with the bundle 92 associated with heat exchanger 88. Steam at about 150° C. exits bundle 92. The steam in line 94 and the steam in line 128 are mixed together in mixing volume 130 and flow therefrom by way of line 132. At this point, the steam in line 132 may be slightly super heated at a temperature of approximately 150° C. at about 3 atmospheres.

Steam flowing through line 132 is directed to bundle 74 of WGS heat exchanger 68. Steam passes through bundle 74 and absorbs additional heat from the reformate gas in WGS reactor 12 and exits via line 134 at a temperature of approximately 350° C. Line 134 is connected to pressure regulator 136 to maintain the pressure of the steam at an elevated pressure, preferably at about 3 atmospheres and is discharged at a pressure slightly greater than 2 atmospheres through line 138 to mixing volume 140. Dynamic temperature control is provided by pumping and mixing water from line 142 with steam from line 138 in mixing volume 140. Steam, having an approximate temperature of 350° C., is discharged through line 144 and enters the bundle 56 of heat exchanger 54 to extract heat from the reformate gas in primary reactor 10. The steam exits heat exchanger 54 through line 26 at a temperature of about 500° C. Line 26 is connected to bundle 28 of heat exchanger 24 where the steam transfers heat to the inlet air as discussed earlier cooling the steam to a temperature of approximately 330° C. whereupon it is discharged from exchanger 24 through line 152. Line 152 is connected to bundle 50 in heat exchanger 48 where the steam extracts heat from the reformate gas and exits heat exchanger 48 through line 34 at a temperature of approximately 650° C. Line 34 is connected to mixing volume 32 to mix with heated air introduced via line 30 to form the heated mixture of air/steam in line 36 as described earlier.

The thermal management process of the present invention controls the amount of processed water in the primary reactor and specifically in ATR 42 through two separate steam generation circuits. The first steam generation circuit is defined by vaporizer 122 of combustor 18. The second steam generation circuit is defined by the PrOx reactor 14 including the unit reactor 86 and heat exchangers 88 and 100. By utilizing two separate steam generation circuits, the present invention is able to carefully control the operational temperature of PrOx reactor 14 through the second generation circuit, while utilizing the first generation circuit including combustion vaporizer 122 with no control limits to highly vaporize the remaining amount of water. Under typical operational conditions, the second steam generation circuit is able to provide up to 50 percent of the total steam requirements with the balance being provided by the first steam generation circuit. Furthermore, the temperature of PrOx reactor 14 can be controlled preferably between a range of about 100 to 150° C. by use of steam pressure regulator 136 which is coupled to the steam generation circuit downstream of PrOx reactor 14 and combustion vaporizer 122. Regulator 136 maintains the steam pressure in PrOx reactor 14 at a constant pressure level typically between 1 to 7 atmospheres. Preferably, regulator 136 controls the circuit pressure at about 3 atmospheres.

Depending on the temperature limits of regulator 136 and other application constraints, regulator 136 can be optionally placed in a variety of places along the steam flow path such as in line 34 between heat exchanger 48 and mixing volume 32 or in line 152 between heat exchanger 24 and heat exchanger 48 or in line 26 between heat exchanger 54 and heat exchanger 24 or in line 132 between mixing volume 130 and heat exchanger 68.

Depending on operating conditions, including the level of carbon monoxide in the reformate gas exiting water gas shift reactor 12, about 20 to 35 percent of the total heat needed by the primary reactor 10 and specifically ATR 42, is supplied by PrOx reactor 14. After discharge from WGS reactor 12, the reformate passes through heat exchanger 88 prior to the PrOx unit reactor 86)in order to reduce the temperature of the reformate gas from a temperature in the range of 250 to 400° C. to the desired temperature range of 150 to 200° C. After discharge from PrOx unit reactor 86, the reformate passes through heat exchanger 100 in order to reduce the temperature of the reformate gas from a temperature in the range of 160 to 240° C. to the desired temperature range of 90 to 150° C.

The heat recovered in heat exchangers 88, 100 are used to generate a source of vaporized water or steam. Specifically, heat energy is added to ambient water entering via line 102 within the heat exchanger 100. Line 148 transfers the heated liquid water through the bundle 150 in PrOx 86 where the heat generated by the chemical reaction therein is transferred to the water to form a high quality water vapor (i.e. a vapor quality between 0.7 and 1.0). The partially vaporized water exits the PrOx via line 90 and enters heat exchanger 88. The partially vaporized water is heated in bundle 92 and transformed to fully vaporize water or steam exiting heat exchanger 88 via line 94. The steam in line 94 combines with the steam in line 128 from combustion vaporizer 122 at mixing volume 130 and is discharged through line 132. The steam in line 132 represents the total process steam for the primary reactor 10 (i.e., the total amount of steam needed relative to the flow of reformate) and is further utilized upstream to cool the reformate gas, thereby adding heat to the process steam passing through heat exchangers 68, 54, 24 and 48, respectively.

During a large up-transient event, the increased reformate gas flow demand causes an initial drop in power. Since the various heat exchangers or vaporizers typically have the slowest response time, it is preferred to increase the PrOx air and water flows before increasing the ATR fuel flow, thereby generating the necessary steam flow to maintain a desired s/c ratio while achieving the increased flow demand. Specifically, increases in the air flow in line 146 and the water flow in line 102 lead the increase in the fuel flow in line 40. The combustor vaporizer 122 may be operated in a similar fashion to provide increased steam flow though line 128 for accommodating up-transients. Specifically, by increasing the anode stochiometry, additional $H_2$ in the anode exhaust 110 will be provided to the combustor 120 to provide additional thermal input to be used for vaporization of water stream 124. The air flow 116 to the combustor 120 would also be increased to maintain the combustor operating temperature. The combustor 120 may also be operated below maximum vaporization capacity so that sufficient thermal mass is available to provide additional vaporization capacity. The increase steam generated by the PrOx heat exchangers 88, 100, 150 and by the combustor heat exchanger 122 are used to avoid an initial drop in power and to increase efficiency. If the fuel processor is operated with an excess of steam, the increase reformate flow demand may also be accommodated by temporarily increasing the flow rate of the fuel supply stream at a rate greater than that required to maintain the desired S/C ratio. In this mode of operation, the air stream to the PrOx is also increased to so that the PrOx reactor can accommodate the increased CO levels in the reformate stream resulting from the decrease in the efficiency of the WGS reactor due to the lower S/C ratio.

In addition to combustion vaporizer 122 and PrOx heat exchanger 100, the thermal management process of the present invention also utilizes pressure regulator 136 to insure that the desired S/C ratio is maintained even under transient conditions. Specifically, pressure regulator 136 insures that the water vaporization temperature does not change by controlling the pressure of the steam at a near constant level even as the pressure within primary reactor 10 changes. Any excess heat is eventually carried out through the exhaust of combustor 18. When additional water vaporization is required, the needed thermal energy is absorbed from the hot gases in the combustor exhaust gas stream by combustor vaporizer 122.

Without regulator 136, the pressure in the portion of the steam loop that includes combustor vaporizer bundle 122 and PrOx cooling bundle 150 would fluctuate depending upon the power generation of fuel cell 16. For example, when fuel cell 16 is operating at reduce power, the vapor pressure of the steam drops causing a surge of steam until the vaporized water is cooled to a new vaporization temperature. Alternatively, when fuel cell 16 is operating at maximum power, the vapor pressure rises causing the steam output to be suppressed until the vaporized water is heated to a new vaporization temperature. Further, the steam loop including pressure regulator 136 permits utilization of the steam as an atomizing agent to assist in the distribution of liquid fuel in inlet 38 of primary reactor 10. This steam atomizer has the advantage of being able to atomize fuel at high inlet temperatures without cooling the air/steam mixture through coupled metering cooling utilized with conventional liquid fuel injector nozzles.

Figure 2:
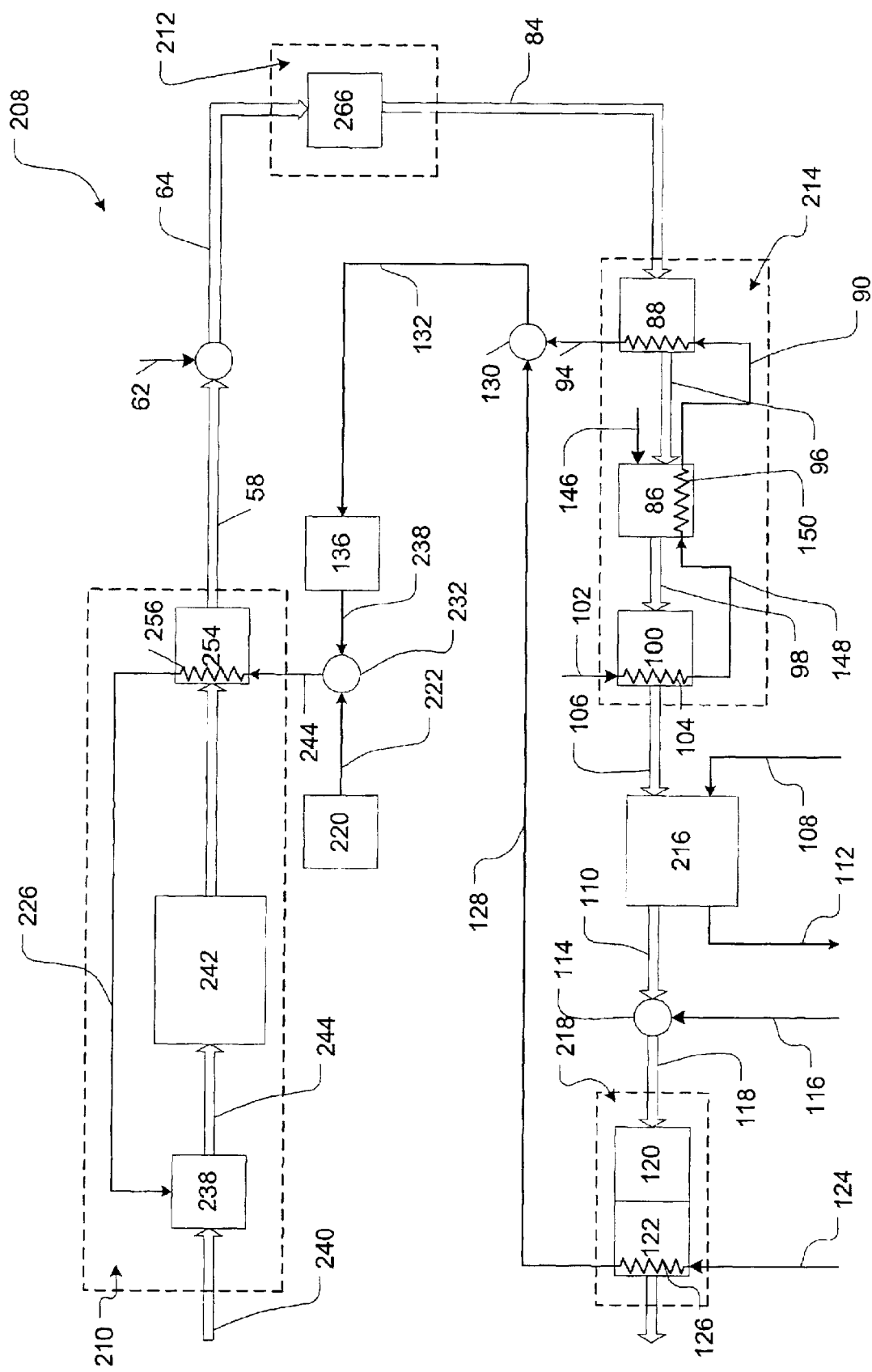
FIG. 2 is a schematic diagram of an alternate embodiment of the process according to the present invention.

With reference now to FIG. 2, a second preferred embodiment of the present invention is illustrated and designated by the reference numeral 208. Where the elements of the second preferred embodiment are the same as those in the first preferred embodiment identical reference number designations will be used. Where the elements of the second preferred embodiment are similar to those in the first preferred embodiment reference numeral designating incremented by 200 will be used. In the second preferred embodiment of the present invention, two heat exchangers have been eliminated in primary reactor 210. The fuel processor system 208 includes an inlet 238, ATR 242, WGS reactor 212, PrOx reactor 214, fuel cell 216 and catalytic combustor 218. Specifically, WGS reactor 212 is a medium temperature shift (MTS) reactor to 66. In the second preferred embodiment, intake air is pumped from compressor 220 through line 222 into mixing volume 232. Air combines with steam flowing through line 238 at mixing volume 232 to form an air/steam mixture which flows into line 244. The air/steam mixture then flows through bundle 256 of heat exchanger 254 where heat is transferred from the reformate gas to the air/steam mixture. The heated air/steam mixture flows through line 226 into primary reactor inlet 238. Fuel is injected from line 240 into inlet 238 where a fuel/air/steam mixture is formed and input to auto thermal reactor 242 via line 244.

The HTS/LTS reactor configuration of the first preferred embodiment have been combined into a medium temperature shift (MTS) reactor 266 for carbon monoxide reduction. In all other aspects, the second preferred embodiment of the present invention operates in a manner similar to that previously described with respect to the first preferred embodiment.

The present invention has been described in terms of a fuel reforming system in combination with a fuel cell system as preferred embodiments. As such, the preferred embodiments are described as self-contained fuel cell systems particularly suitable for vehicular applications. However, a skilled practitioner will readily recognized that the principles of the present invention are equally applicable to a fuel reforming systems only. As such the present invention is not intended to be limited to the preferred embodiments, and is subject to various changes, adaptations and modifications encompassed within the scope of the present invention as set forth hereinafter in the claims.

What is claimed is:

1. A method of operating a fuel reforming system for the production of a hydrogen-containing reformate gas comprising the steps of:
    reacting an air supply stream, a water supply stream and a fuel supply stream in an auto thermal reformer to form said reformate gas having a concentration of carbon monoxide;
    introducing said reformate gas and a first air stream into a preferential oxidation reactor to lower said concentration of carbon monoxide;
    heating a first water stream, which does not contain fuel, in said preferential oxidation reactor to form a first portion of vaporized water, the temperature of the preferential oxidation reactor being controlled by said first water stream;
    heating a second water stream, which does not contain fuel, in a vaporizer to form a second portion of vaporized waters,
    mixing said first portion and said second portion of said vaporized water to form a steam stream which is mixed with said air supply stream for regulating the temperature of said reformate gas, provided that said mixed stream does not contain fuel.

2. The method of operating a fuel reforming system of claim 1 wherein said steam stream is mixed with said air supply stream prior to reaction within the auto thermal reformer.

3. The method of operating a fuel reforming system of claim 1 wherein said second portion of said vaporized water comprises less than 50% of said steam stream.

4. The method of operating a fuel reforming system of claim 1 wherein the said preferential oxidation reactor operates within a temperature range of between 100° C. and 150° C.

5. The method of operating a fuel reforming system of claim 4 further comprising the step of regulating the pressure of said steam stream prior to said auto thermal reactor for controlling the temperature thereof.

6. The method of operating a fuel reforming system of claim 1 further comprising the step increasing the flow rate of at least one of said first water stream and said second water stream prior to increasing the flow rate of said fuel supply stream in response to an increased reformate gas flow demand.

7. The method of operating a fuel reforming system of claim 1 wherein said vaporizer is operated below a maximum vaporization capacity during a steady-state operation, thereby providing a thermal mass for additional vaporization capacity in response to an increase reformats gas flow demand.

8. The method of operating a fuel reforming system of claim 1 further comprising the step of temporarily increasing the flow rate of said fuel supply stream to a rate greater than a target rate required to respond to an increased reformate gas flow demand.

9. The method of claim 1 wherein said vaporizer is a combustor.

10. The method of claim 1 wherein said first and second vaporized portions constitute at least a portion of said water supply stream.

* * * * *